UNITED STATES PATENT OFFICE 2,242,474

WATER-SOLUBLE BASIC DYESTUFFS

Gerd Kochendoerfer, Ludwigshafen - on - the-Rhine, Werner Mueller, Cologne, Bernd Eistert, Ludwigshafen - on - the - Rhine, and Walther Retter, Cologne-Deutz, Germany, assignors to General Aniline & Film Corporation, a corporation of Delaware No Drawing. Application July 27, 1939, Serial No. 286,866. In Germany July 29, 1938

4 Claims. (Cl. 260—240)

The present invention relates to new basic dyestuffs. We have found that watersoluble basic dyestuffs which are fast to light are obtained by causing 1.3.3-trialkyl-2-methylene-indolines which are substituted in 5-position by fluorine, chlorine, bromine or trifluormethyl to react in acid medium with aldehydes the aldehyde groups of which are in conjugation with a tertiary basic nitrogen atom by at least one carbon-carbon double linkage.

Basic aldehydes of the said kind are for example para-aminobenzaldehydes the amino group of which is substituted by two identical or different alkyl, aralkyl or aryl radicles, among which there may be mentioned para-N-dimethylamino- and para-N-diethylamino-benzaldehyde, para-N-omega - cyanethyl - N -benzylaminobenzaldehyde, para-aldehydo - N - alkyl-diphenylamines, e. g. para - aldehydo - N - methyldiphenylamine and para-aldehydo-para'- ethoxy-N-methyldiphenylamine, and also para-dimethylamino-cinnamaldehyde, and also heterocyclic nitrogen compounds substituted by the aldehyde group, such as 1-methyl - 2 - phenylindole - 3 - aldehyde, 1.3.3-trimethyl - 2 - methylene-indoline-omega-aldehyde and 1.2.3.3-tetramethyl-indoline-5-aldehyde.

Among suitable 5-substituted 1.3.3-trialkyl-2-methylene-indolines there may be mentioned for example 5-chlor-1.3.3-trimethyl-2-methylene-indoline or the 5-chlor-1.2.3.3-tetramethylindoline-methosulphate derived therefrom and the corresponding 5-fluor-, 5-brom- and 5-trifluormethyl compounds or the 7-chlor- or 7-methoxy-derivatives, the nitration products or also 4.7-dimethoxy-5-chlor-1.3.3-trimethyl-2- methyleneindoline and also homologues of the said compounds which contain in the 1- and 3-positions ethyl or other lower alkyl groups instead of one or more methyl groups. These starting materials may be prepared according to the method described in "Berichte der Deutschen Chemischen Gesellschaft," vol. 31, pages 1496 to 1497 (1898), from the corresponding phenylhydrazines.

The reaction may be effected by bringing the reactants together, and if necessary moderately heating them, in glacial acetic acid, alcoholic hydrochloric acid, acetic anhydride or other acid liquid.

As compared with the known dyestuffs containing no substituent of the above identified group in the 5-position of the indoline ring, the new dyestuffs are distinguished generally speaking by their great strength and better fastness to light while also having satisfactory solubility in water. They are eminently suitable for dyeing acetate artificial silk and they may also be used for dyeing paper, silk, leather and cotton mordanted with tannic acid. The lakes prepared therefrom by reaction with complex phosphotungstic and/or phosphomolybdic acids are also distinguished by high fastness to light.

The following examples will further illustrate how the said invention may be carried out in practice, but the invention is not restricted to these examples. The parts are by weight.

Example 1

A solution of 20 parts of 5-chlor-1.3.3-trimethyl-2-methylene-indoline and 23 parts of para-aldehydo-para'-ethoxy-N-methyldiphenylamine in glacial acetic acid is heated for 6 hours at about 100° C. The reaction mixture is poured into such an amount of hot water that the resulting dyestuff is completely dissolved. The resinous by-products are filtered off and the dyestuff salted out. It dyes acetate artificial silk reddish violet shades of very good fastness to light from aqueous solution. The dyeing is capable of being discharged white. Acetate artificial silk may also be printed with the dyestuff by using the usual printing pastes.

The dyestuff may be formulated as follows:

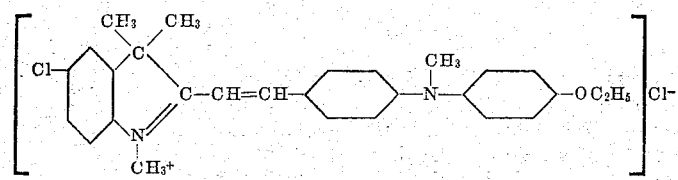

By using the equivalent amount of the 7-methoxy derivative instead of 5-chlor-1.3.3-trimethyl-2-methylene-indoline, a somewhat more bluish dyestuff is obtained which has similar good properties.

Example 2

A solution of 16 parts of 5-chlor-1.2.3.3-tetramethyl-indoline-methosulphate and 10 parts of para-N-diethylaminobenzaldehyde in 80 parts of glacial acetic acid is heated for 3 hours at about 100° C. After dilution with water, filtration of the solution and salting out there is obtained a dyestuff which dyes silk and acetate artificial silk bluish red shades. If there be precipitated from a solution of the dyestuff by means of phosphotungstic acid the complex color lake, a violet pigment dyestuff having good fastness to light is obtained.

The dyestuff may be formulated as follows:

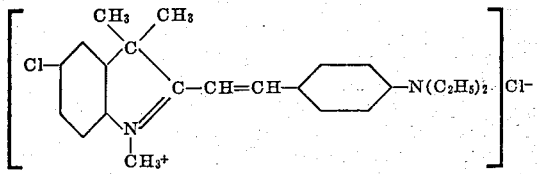

Similar dyestuffs are obtained under otherwise identical conditions with the following aldehydes:

| Aldehyde | Color of dyeing on acetate artificial silk |
|---|---|
| Para-N-dimethylaminobenzaldehyde | Bluish red. |
| Para-N-omega-cyanethyl-N-ethylamino-benzaldehyde. | Do. |
| Para-N-methyl-N-phenylamino-benzaldehyde | Violet red. |
| Para-N-dimethylaminocinnamaldehyde | Blue. |

Example 3

36.5 parts of the mononitro compound obtained by nitration of 5-chlor-1.2.3.3-tetramethylindolinemethosulphate are heated with 25.5 parts of para-aldehydo-para'-ethoxy-N-methyldiphenylamine in 100 parts of glacial acetic acid for several hours at about 100° C. After diluting with water, filtering the solution and salting out, a dyestuff is obtained which dyes acetate artificial silk blue-violet shades of very good fastness to light which are capable of being discharged white.

The dyestuff may be formulated as follows:

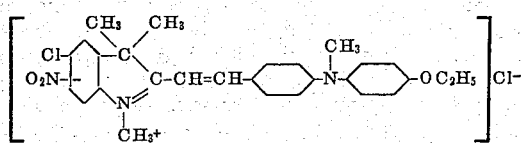

The dyestuff may also be prepared by causing the nitro-5-chlor-1.3.3-trimethyl-2-methylene-indoline set free from the above-mentioned nitro compound by treatment with caustic soda solution to react in alcoholic solution with the aldehyde with the addition of hydrochloric acid or phosphoric acid.

Example 4

21 parts of 1.3.3-trimethyl-2-methylene-indoline-omega-aldehyde are heated with 22 parts of 5-chlor-1.3.3-trimethyl-2-methylene-indoline in 70 parts of acetic anhydride for half an hour at about 100° C. After diluting with water, filtering the solution and salting out there is obtained a dyestuff which dyes silk and cotton mordanted with tannic acid brilliant bluish red shades.

Example 5

12 parts of 1-methyl-2-phenylindole-3-aldehyde are heated with 10 parts of 5-chlor-1.3.3-trimethyl-2-methylene-indoline in 80 parts of glacial acetic acid for 3 hours at about 100° C. After diluting with hot water, filtering and salting out there is obtained a dyestuff very fast to light which dyes weighted silk scarlet red shades and acetate artificial silk orange-red shades.

The dyestuff corresponds to the following formula:

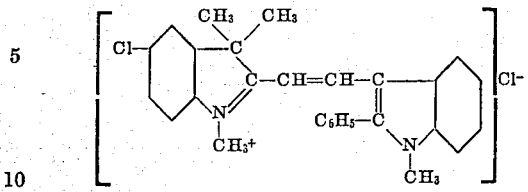

Similar dyestuffs are obtained by using, instead of the said indoline, its 7-chlor or 7-methoxy derivatives, its 4.7-dimethoxy derivatives or the mononitro compound specified in Example 3.

Instead of 5-chlor-1.3.3-trimethyl-2-methylene-indoline there may also be used indolines containing ethyl radicals instead of one or more methyl groups.

Example 6

8.9 parts of para-N-diethylaminobenzaldehyde and 9.6 parts of 5-fluor-1.3.3-trimethyl-2-methylene-indoline are dissolved in glacial acetic acid and heated for some hours at 100° C. The solution obtained is diluted with water and the dyestuff salted out therefrom. It is redissolved in hot water, freed from resinous insoluble by-products and again salted out. It is thus obtained in the form of crystals which are readily soluble in alcohol or water. The dyestuff dyes cotton mordanted with tannic acid and acetate artificial silk reddish violet shades. The complex color lake produced by means of phospho-tungstic-molybdic acid is distinguished by its purity and fastness to light.

The dyestuff may be formulated as follows:

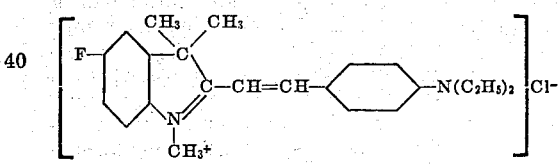

Similar dyestuffs are obtained under otherwise identical conditions with the following aldehydes:

| Aldehyde | Color of dyeing on acetate artificial silk |
|---|---|
| Para-aldehydo-para'-ethoxy-N-methyldiphenylamine. | Reddish violet. |
| Para-N-omega-cyanethyl-N-ethylaminobenzaldehyde. | Yellowish pink. |
| Para-N-dimethylamino-cinnamaldehyde | Blue. |
| 1.3.3-trimethyl-2-methylene-indoline-omega-aldehyde. | Pink. |
| 1-methyl-2-phenylindole-3-aldehyde | Orange. |

By using the equivalent amount of 5-brom-1.3.3-trimethyl-2-methylene-indoline instead of the 5-fluor-1.3.3-trimethyl-2-methylene-indoline the following dyestuffs may be prepared:

| 5-brom-1.3.3-trimethyl-2-methylene-indoline condensed with— | Color of dyeing on acetate artificial silk |
|---|---|
| Para-N-diethylaminobenzaldehyde | Reddish violet. |
| Para-aldehydo-para'-ethoxy-N-methyldiphenylamine. | Do. |
| Para-N-omega-cyanethyl-N-ethylaminobenzaldehyde. | Bluish pink. |
| Para-N-diethylamino-cinnamaldehyde | Blue. |
| 1.3.3-trimethyl-2-methylene-indoline-omega-aldehyde. | Bluish pink. |
| 1-methyl-2-phenyl-indole-3-aldehyde | Orange. |

By using the equivalent amount of 5-trifluor-methyl-1.3.3-trimethyl-2-methylene-indoline instead of the 5-fluor-1.3.3-trimethyl-2-methylene-indoline the following dyestuffs may be prepared:

| 5-trifluormethyl - 1.3.3 - trimethyl - 2 - methylene-indoline condensed with— | Color of dyeing on acetate artificial silk |
|---|---|
| Para-aldehydo-para'-ethoxy-N-methyldiphenylamine. | Violet. |
| 1-methyl-2-phenylindole-3-aldehyde | Orange. |

What we claim is:

1. Watersoluble basic dyestuffs corresponding to the general formula

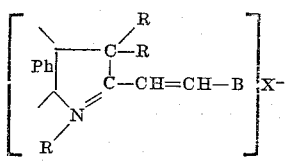

wherein Ph stands for a phenylene radical substituted in 5-position by a member of the group consisting of fluorine, chlorine, bromine and trifluormethyl, wherein the R's stand for alkyl radicals, and wherein B stands for an N-alkyl-diphenylamine radical attached to the methine group shown in 4-position with reference to the amino group in 1-position, and wherein X stands for the anion of an acid.

2. Watersoluble basic dyestuffs corresponding to the general formula

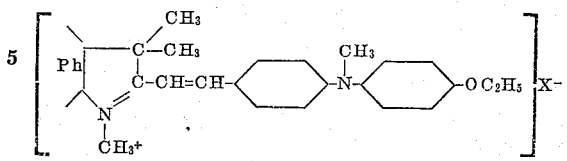

wherein Ph stands for a phenylene radical which is substituted in the 5-position by a member of the group consisting of fluorine, chlorine, bromine and trifluormethyl, and wherein X stands for the anion of an acid.

3. The watersoluble dyestuff corresponding to the formula

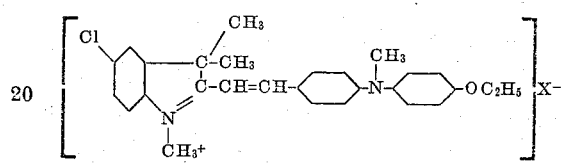

wherein X stands for the anion of an acid.

4. The watersoluble dyestuff corresponding to the formula

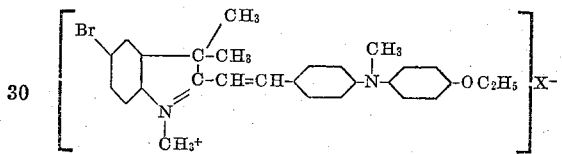

wherein X stands for the anion of an acid.

GERD KOCHENDOERFER.
WERNER MUELLER.
BERND EISTERT.
WALTHER RETTER.